(12) United States Patent
Kim et al.

(10) Patent No.: US 11,467,603 B2
(45) Date of Patent: Oct. 11, 2022

(54) MOVING ROBOT AND CONTROL METHOD THEREOF

(71) Applicant: LG ELECTRONICS INC., Seoul (KR)

(72) Inventors: Minuk Kim, Seoul (KR); Suuk Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 556 days.

(21) Appl. No.: 16/476,916

(22) PCT Filed: Jan. 10, 2018

(86) PCT No.: PCT/KR2018/000470
§ 371 (c)(1),
(2) Date: Jul. 10, 2019

(87) PCT Pub. No.: WO2018/131884
PCT Pub. Date: Jul. 19, 2018

(65) Prior Publication Data
US 2019/0332121 A1 Oct. 31, 2019

(30) Foreign Application Priority Data
Jan. 10, 2017 (KR) .................. 10-2017-0003764

(51) Int. Cl.
*G05D 1/02* (2020.01)
*A47L 5/22* (2006.01)
(Continued)

(52) U.S. Cl.
CPC .............. *G05D 1/0274* (2013.01); *A47L 5/22* (2013.01); *A47L 9/009* (2013.01); *A47L 9/2826* (2013.01);
(Continued)

(58) Field of Classification Search
CPC ............... G05D 1/0274; G05D 1/0214; G05D 2201/0215; G05D 1/0248; A47L 5/22;
(Continued)

(56) References Cited

U.S. PATENT DOCUMENTS 9,008,835 B2 * 4/2015 Dubrovsky ............ B25J 13/006
700/264
9,675,226 B2 * 6/2017 Kim .................... A47L 11/4061
(Continued)

FOREIGN PATENT DOCUMENTS

KR        10-0791386         1/2008
KR    10-2012-0102955        9/2012
(Continued)

OTHER PUBLICATIONS

International Search Report dated Jun. 8, 2018 issued in Application No. PCT/KR2018/000470.

*Primary Examiner* — Bhavesh V Amin
(74) *Attorney, Agent, or Firm* — KED & Associates, LLP

(57) ABSTRACT

A moving robot and a control method thereof according to the present invention create a cleaning map including information on a travelable area of a cleaning area based on obstacle information, create a create a manufactured user map by changing forms and outlines by area with respect to a plurality of area configuring the cleaning map, and create a user map having a form similar to that of the cleaning are in a real indoor space by changing a form and an outline of a map including information on the travelable area according to an arear, so that a user easily recognizes a position of each area to input a cleaning command through the map, and a cleaning command with respect to an area which the moving robot cannot run is prevented from being input. Since the moving robot does not unnecessarily move an area, operation power consumption is reduced. The moving
(Continued)

robot may run a cleaning area with limited power to efficiently clean the cleaning area.

28 Claims, 11 Drawing Sheets

(51) Int. Cl.
*A47L 9/00* (2006.01)
*A47L 9/28* (2006.01)

(52) U.S. Cl.
CPC .......... *A47L 9/2852* (2013.01); *G05D 1/0214* (2013.01); *A47L 2201/04* (2013.01); *A47L 2201/06* (2013.01); *G05D 2201/0215* (2013.01)

(58) Field of Classification Search
CPC ...... A47L 9/009; A47L 9/2826; A47L 9/2852; A47L 2201/04; A47L 2201/06; A47L 9/28; G06K 9/00664; G06K 9/2036; G06K 9/6254; B25J 11/0085; B25J 9/1666; B25J 9/1676; B25J 13/081; B25J 19/023; B25J 19/04
See application file for complete search history.

(56) References Cited

U.S. PATENT DOCUMENTS

| | | | | |
|---|---|---|---|---|
| 10,488,865 | B2* | 11/2019 | Afrouzi | G05D 1/0217 |
| 10,496,262 | B1* | 12/2019 | Ebrahimi Afrouzi | B25J 13/00 |
| 10,695,906 | B2* | 6/2020 | Kim | G05D 1/0044 |
| 10,967,512 | B2* | 4/2021 | Kim | B25J 9/1666 |
| 11,007,644 | B2* | 5/2021 | Wiegel | A47L 9/2857 |
| 2005/0171636 | A1* | 8/2005 | Tani | G05D 1/0276 |
| | | | | 701/23 |
| 2008/0046125 | A1 | 2/2008 | Myeong et al. | |
| 2009/0182464 | A1* | 7/2009 | Myeong | G05D 1/0274 |
| | | | | 701/25 |
| 2012/0125363 | A1* | 5/2012 | Kim | A47L 9/2805 |
| | | | | 134/6 |
| 2013/0000675 | A1* | 1/2013 | Hong | G05D 1/0246 |
| | | | | 15/49.1 |
| 2013/0024025 | A1* | 1/2013 | Hsu | G05D 1/0274 |
| | | | | 901/1 |
| 2014/0207282 | A1* | 7/2014 | Angle | H04W 4/30 |
| | | | | 901/1 |
| 2014/0316636 | A1* | 10/2014 | Hong | G05D 1/0274 |
| | | | | 901/1 |
| 2015/0120056 | A1 | 4/2015 | Noh et al. | |
| 2015/0212500 | A1* | 7/2015 | Akabane | G05D 1/0044 |
| | | | | 700/275 |
| 2015/0223659 | A1* | 8/2015 | Han | G05D 1/0274 |
| | | | | 134/18 |
| 2015/0250372 | A1* | 9/2015 | T P | A47L 9/2826 |
| | | | | 701/28 |
| 2016/0147230 | A1* | 5/2016 | Munich | G05D 1/0246 |
| | | | | 701/28 |
| 2016/0150933 | A1* | 6/2016 | Duenne | A47L 9/2805 |
| | | | | 15/319 |
| 2016/0297072 | A1* | 10/2016 | Williams | B25J 9/1694 |
| 2016/0309973 | A1* | 10/2016 | Sheikh | A47L 11/4044 |
| 2017/0031925 | A1* | 2/2017 | Mishra | G06F 16/252 |
| 2017/0273527 | A1* | 9/2017 | Han | G01C 21/005 |
| 2018/0085927 | A1* | 3/2018 | Kapoor | B25J 9/1664 |
| 2018/0200888 | A1* | 7/2018 | Kim | A47L 9/2857 |
| 2018/0210452 | A1* | 7/2018 | Shin | A47L 9/2805 |
| 2018/0348783 | A1* | 12/2018 | Pitzer | G05D 1/024 |
| 2018/0373242 | A1* | 12/2018 | Han | A47L 11/4011 |
| 2019/0015984 | A1* | 1/2019 | Kim | B25J 9/1679 |
| 2019/0015985 | A1* | 1/2019 | Kim | B25J 11/0085 |
| 2019/0061157 | A1* | 2/2019 | Suvarna | B25J 9/1697 |
| 2019/0101926 | A1* | 4/2019 | Takaoka | G05D 1/0274 |

FOREIGN PATENT DOCUMENTS

| | | |
|---|---|---|
| KR | 10-2013-0002218 | 1/2013 |
| KR | 10-2015-0050160 | 5/2015 |
| KR | 10-2016-0036008 | 4/2016 |

* cited by examiner (a)

(b)

(a)

(b)

(a)                    (b)

(c)

(a)

(b)

MOVING ROBOT AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2018/000470, filed Jan. 10, 2018, which claims priority to Korean Patent Application No. 10-2017-0003764, filed Jan. 10, 2017, whose entire disclosures are hereby incorporated by reference.

TECHNICAL FIELD

The present invention relates to a moving robot and a control method thereof and, more particularly, to a moving robot capable of performing cleaning by creating a map with respect to a cleaning area and a control method thereof.

BACKGROUND ART

In general, a moving robot is a device to automatically clean an area to be cleaned by sucking foreign matters such as dust from a bottom of the area while running the area without an operation of a user.

Such a moving robot detects a distance to obstacles such as furniture or office supplies installed inside the cleaning area or walls, and accordingly maps the cleaning area or controls drive of a left wheel or a right wheel to perform an obstacle avoidance operation.

However, the moving robot moves based on a current position without dividing an area to perform cleaning. When there are obstacles during running a straight line, since the moving robot runs in a turnabout scheme, the moving robot cannot repeatedly clean a specific area or cannot return to an initial position after moving.

Accordingly, the moving robot cleans the specific area using a stored map and prevents duplicate cleaning.

However, when creating the map, since the moving robot moves through wall track (wall following) and extracts an outline with respect to a running area, there is a need to divide a plurality of rooms connected to each other into respective areas.

Further, since a plurality of areas is connected through small spaces, for example, a hallway so that an outline of a map is complicated, it is difficult to divide the plurality of areas. Since the plurality of areas is different from a real form of an indoor space, a user cannot easily recognize the areas.

DISCLOSURE OF INVENTION

Technical Problem

An embodiment of the present invention provides a moving robot which converts a map with respect to a cleaning area into a form having an easy confirmation characteristic to clean a cleaning area according to a cleaning command input through a map, and a control method thereof.

Solution to Problem

An exemplary embodiment of the present invention provides a moving robot including: a body running a cleaning area to suck foreign matters; an obstacle sensing unit configured to detect obstacles by acquiring a front image of the body; a data unit configured to store a map with respect to the cleaning area; and a control unit configured to determine the obstacles from the acquired image from the obstacle sensing unit, to create a cleaning map including information on a travelable area of the cleaning area based on information on the obstacles, and to control the body to run the cleaning area based on the cleaning map to pass through or avid the obstacles, wherein the control unit changes forms and outlines by area to create a manufactured user map corresponding to a form of the cleaning area.

The control unit may change a form of the area and simplify an outline to create the user map in a drawing form. The control unit may change the form of the area by extending, reducing or removing the area based on an outermost line of each area.

The control unit may change the form of the area based on a different reference corresponding to attributes of the area.

The control unit may changes the form of the area based on a square.

The control unit may change the form and an outline of the area by removing obstacles smaller than a predetermined size and including obstacles larger than the predetermined size corresponding to obstacles located in the area.

The control unit may set attributes of a plurality of areas included in the cleaning map or the user map as one of a main area, a room, or other area.

The control unit may create a guide map displayed by overlapping the cleaning map with the user map.

The moving robot may further include a terminal configured to receive and store the user map and the guide map and to transmit a cleaning command to the body, wherein the control unit may transmit a position and a cleaning state of the body at a predetermined time interval.

The terminal may selectively display one from the user map or the guide map according to setup.

Another exemplary embodiment of the present invention provides a control method of a moving robot, the control method including: running a cleaning area to acquire obstacle information; dividing a travelable area of the cleaning area into a plurality of areas based on the obstacle information to create a cleaning map; manufacturing the cleaning map by changing forms or outlines of a plurality of areas included in the cleaning map; and creating a manufactured user map corresponding to a form of the cleaning area.

The manufacturing of the cleaning map may include creating the user map to have a form similar to the form of the cleaning area by changing a form of each area of the cleaning map and simplifying an outline of each area.

The manufacturing of the cleaning map may include changing the form of the area by extending, reducing or removing the area based on an outermost line by area of the cleaning map.

The control method may further include setting attributes with respect to each area of the cleaning map after creating the cleaning map, wherein attributes of a plurality of areas included in the cleaning map or the user map are set as one of a main area, a room, or other area.

The control method may further include: setting one of the plurality of areas in the cleaning map as the main area according to a size of an area and the number of contact points with other area; setting areas larger than a predetermined size disposed around the main area as the room; and setting remaining areas except for the main area and the room as the other area.

The manufacturing of the cleaning map may include changing the form of the area based on a different reference corresponding to the attribute of the area.

Advantageous Effects of Invention

The moving robot and the control method thereof according to the present invention may create a map for a user in a form similar to a cleaning area of a real indoor space by changing a form and an outline of a map including information on a travelable area of the moving robot according to an area which allow the user to easily recognize a position of each area for inputting a cleaning command.

Furthermore, the moving robot and the control method thereof according to the present invention may prevent a cleaning command with respect to an area which cannot run by displaying a map for a user to overlap with an area which the moving robot may run from being input. Since the moving robot does not unnecessarily move an area, operation power consumption is reduced. The moving robot may run a cleaning area with limited power to efficiently clean the cleaning area.

BEST MODE FOR CARRYING OUT THE INVENTION

Reference will now be made in detail to the preferred embodiments of the present invention, examples of which are illustrated in the accompanying drawings. However, the illustrative discussions above are not intended to be exhaustive or to limit the invention to the precise forms disclosed. Many modifications and variations are possible in view of the above teachings to obtain the disclosure of the present invention. Disclosed embodiments are provided to indicate the spirit and scope of the prevent invention to those skilled in the art can easily realize the present inventive concept. The present invention is defined by only a scope of claims. The same reference numbers are used throughout the specification to refer to the same or like parts. Further, in the present invention, a control unit and other constituent elements included in an air conditioner may be implemented by one or more processors and may be implemented by a hardware device.

Figure 1:
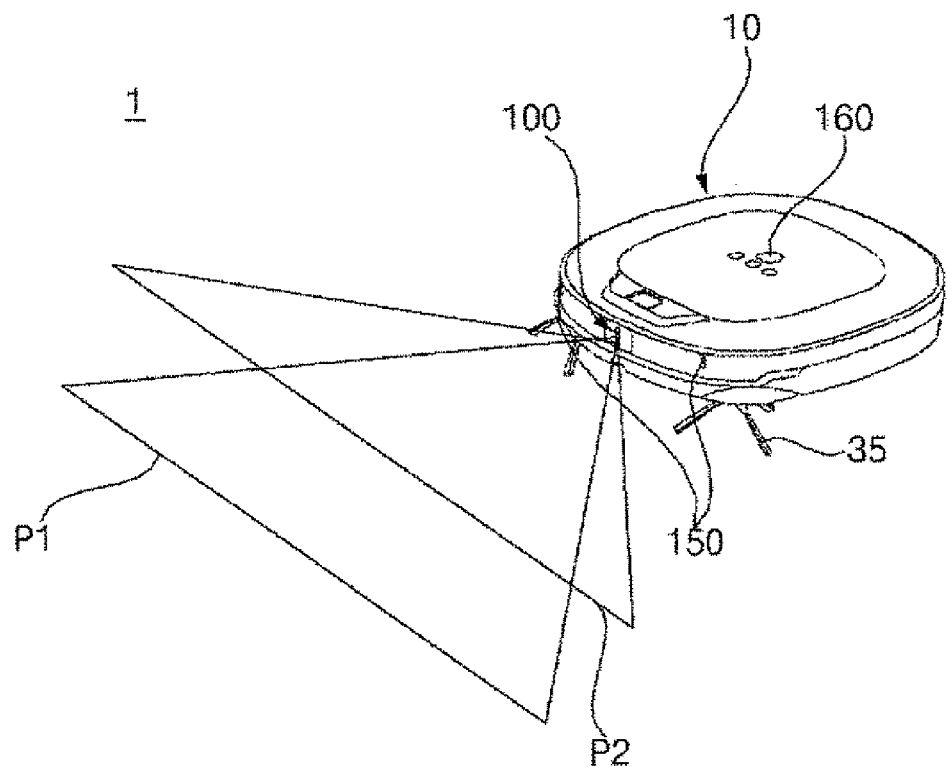
FIG. 1 is a perspective view illustrating a moving robot according to an embodiment of the present invention.
Figure 2:
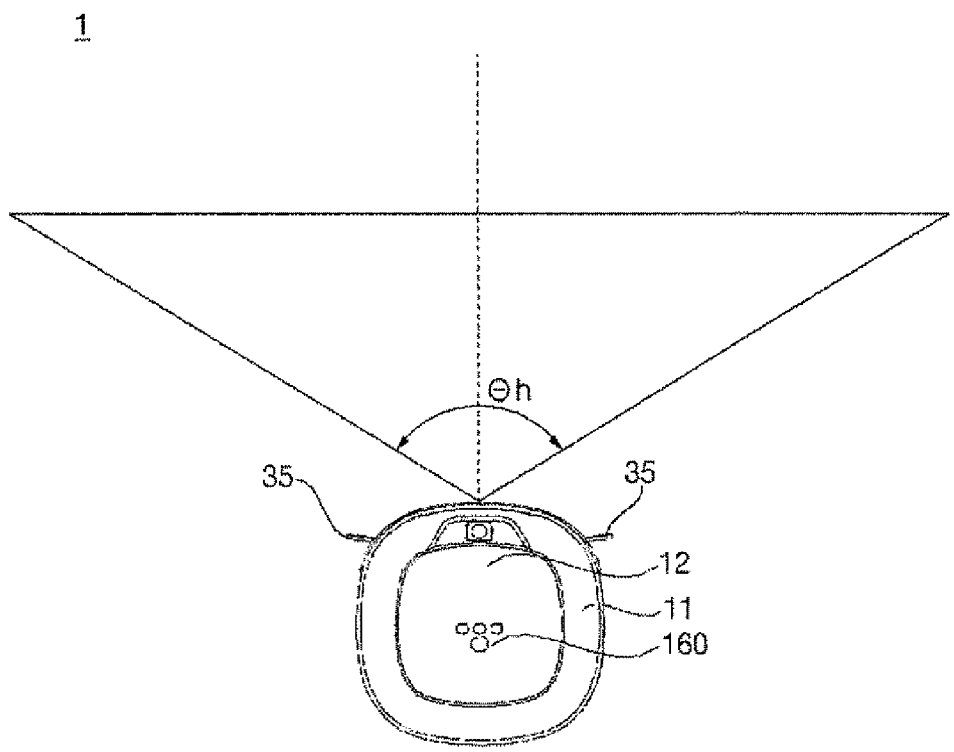
FIG. 2 is a diagram illustrating a horizontal view angle of the moving robot shown in FIG. 1.
Figure 3:
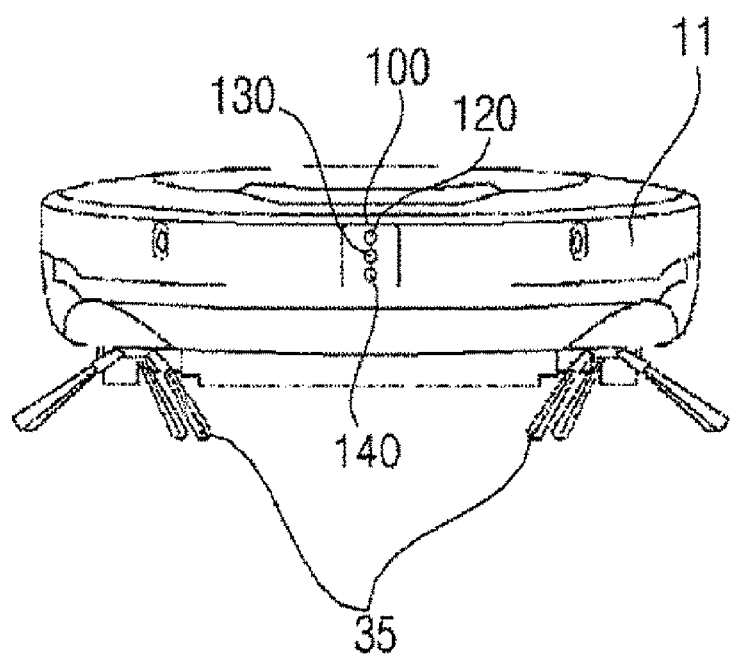
FIG. 3 is a front view illustrating the moving robot shown in FIG. 1.
Figure 4:
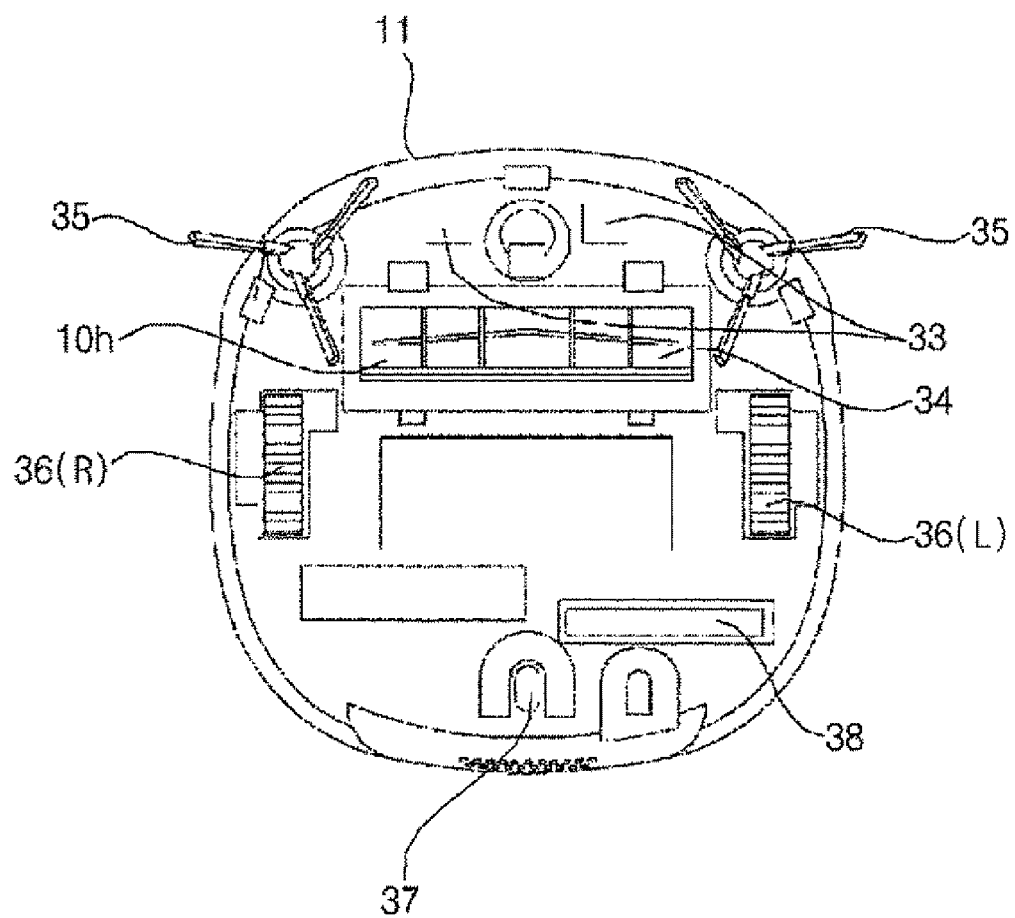
FIG. 4 is a view illustrating a bottom surface of the moving robot shown in FIG. 1.

FIG. 1 is a perspective view illustrating a moving robot according to an embodiment of the present invention. FIG. 2 is a diagram illustrating a horizontal view angle of the moving robot shown in FIG. 1. FIG. 3 is a front view illustrating the moving robot shown in FIG. 1. FIG. 4 is a view illustrating a bottom surface of the moving robot shown in FIG. 1.

Referring to FIG. 1 to FIG. 4, a moving robot 1 according to an embodiment of the present invention moves along a bottom of a cleaning area, and may include a body 10 configured to suck foreign matters such as dust on the bottom and an obstacle sensing unit 100 disposed at a front surface of the body 10.

The body 10 may include a casing 11 forming an outer appearance and being formed therein with a space for receiving components configuring the body 10, a suction unit 34 disposed at the casing 11 to suck foreign matters such as dust or trash, and a left wheel 36L and a right wheel 36R rotatably provided at the casing 11. When the left wheel 36L and the right wheel 36R are rotated, the body 10 moves along a bottom of a cleaning area and the suction unit 34 sucks foreign matters during the above procedure.

The suction unit 34 may include a suction fan (not shown) configured to generate a suction force and a suction hole 10h configured to suck an air current generated by rotation of the suction fan. The suction unit 34 may include a filter configured to collect foreign matters from the air current sucked through the suction hole 10h and a foreign matter collecting barrel (not shown) configured to collect foreign matters from the filter.

Further, the body 10 may include a running driver 250 configured to drive the left wheel 36L and the right wheel 36R. The running driver 250 may include at least one drive motor. The at least one drive motor may include a left wheel drive motor configured to rotate the left wheel 36L and a right wheel drive motor configured to rotate the right wheel 36R.

Operations of the left wheel drive motor and the right wheel drive motor are independently controlled by a running controller of a control unit to perform straight, reverse, or turning of the body 10. For example, when the body 10 runs straight, the left wheel drive motor and the right wheel drive motor are rotated in the same direction. However, when the left wheel drive motor and the right wheel drive motor are rotated with different speeds or are rotated in opposite directions, a running direction of the body 10 may be changed. The moving robot may further include at least one auxiliary wheel 37 configured to stably support the body 10.

A plurality of brushes 35 disposed at a front side of a bottom portion of the casing 11 and including a plurality of blades which radially extend may be further provided. Dust is separated from a bottom of a cleaning area by a plurality of brushes 35, and the dust separated from the bottom is sucked through the suction hole 10h and is collected in a collecting barrel.

A control panel including an operation unit 160 configured to receive various commands for controlling the moving robot 1 from a user may be provided at a top surface of the casing 11.

The obstacle sensing unit 100 may be disposed at a front surface of the body 10.

The obstacle sensing unit 100 is fixed to a front surface of the casing 11, and includes a first pattern irradiation unit 120, a second irradiation unit 130, and an image acquiring unit 140. In this case, as shown, although the image acquiring unit 140 is installed at a lower portion of a pattern irradiation unit, the image acquiring unit 140 may be disposed between a first pattern irradiation unit 120 and the second irradiation unit 130 in some cases.

The body 10 includes a rechargeable battery 38. A charging terminal of a battery 38 is connected to utility power (for example, a power outlet at home) or the body 10 docks a separate charging frame connected with the utility power so that the charging terminal 33 may be electrically connected to the utility power to charge the battery 38. Electric parts configuring the moving robot 1 may receive power from the battery 38. Accordingly, when the battery 38 is charged, the moving robot 1 may automatically run in a state that the charging terminal 33 is electrically separated from the utility power.

Figure 5:
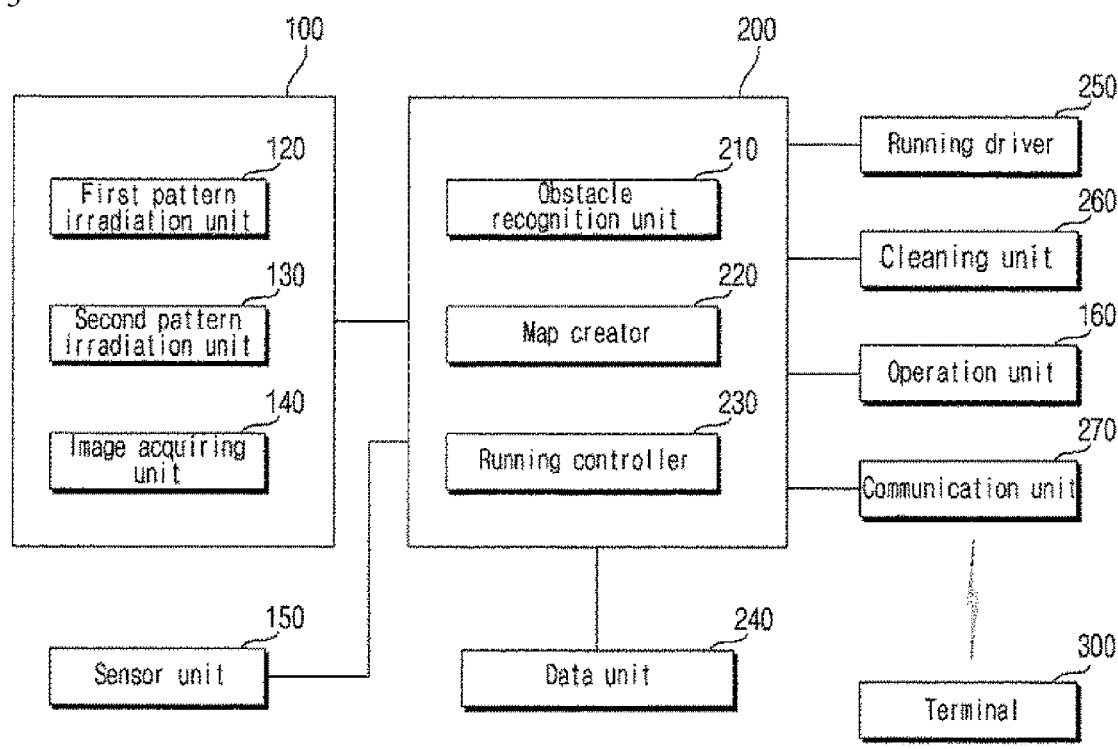
FIG. 5 is a block diagram illustrating main parts of a moving robot according to an embodiment of the present invention.

FIG. 5 is a block diagram illustrating main parts of a moving robot according to an embodiment of the present invention.

As shown in FIG. 5, the moving robot 1 includes a running driver 250, a cleaning unit 260, a data unit 240, an obstacle sensing unit 100, a sensor unit 150, a communication unit 270, an operation unit 160, and a control unit 200 configured to control an overall operation.

The operation unit 160 includes input means such as at least one button, switch, and touch pad to receive a user command. As described above, the operation unit 160 may be provided at a top end of the body 10.

The data unit 240 stores an acquired image input from the obstacle sensing unit 100, reference data for determining obstacles by an obstacle recognition unit 210, and obstacle information on detected obstacles. The data unit 240 stores control data for controlling an operation of the moving robot 10, data according to a cleaning mode of the moving robot 10, and a map including obstacle information created from a map creator 220. For example, the data unit stores at least one of a base map, a cleaning map, a guide map, or a user map.

Further, the data unit 240 stores readable data by a micro-processor, and may include a Hard Disk Drive (HDD), a Solid State Disk (SSD), a Silicon Disk Drive (SDD), a ROM, a RAM, a CD-ROM, a magnetic tape, a floppy disk, and an optical data storage device.

The communication unit 270 communicates with a terminal (not shown). Further, the communication unit 270 may connect with an internet through a network at home to communicate with an external server or a terminal for controlling the moving robot.

The communication unit 270 transmits a created map to a terminal, receives a cleaning command from the terminal, and transmits data with respect to an operation state and a cleaning state of the moving robot. The communication unit includes short range wireless communication modules such as ZigBee and Bluetooth and communication modules such as Wi-Fi and wibro to transmit/receive data.

Meanwhile, the terminal is equipped with a communication module to access a network and is installed therein with a program or an application for controlling the moving robot. The terminal may use devices such as a computer, a laptop, a smart phone, a PDA, and a tablet PC. In addition, the terminal may use wearable devices such as a smartwatch.

The running driver 250 includes at least one drive motor so that a moving robot runs according to a control command of the running controller 230. As described above, the running driver 250 may include a left wheel drive motor configured to rotate a left wheel 36L and a right wheel drive motor configured to rotate a right wheel 36R.

The cleaning unit 260 operates brushes to make a state capable of easily sucking dust or foreign matters around the moving robot, and operates a suction device to suck dust or foreign matters. The cleaning unit 260 controls an operation of a suction fan included in the suction unit 34 for sucking foreign matters such as dust or trash so that the suction fan introduces the foreign matters into a foreign matter collecting barrel through a suction hole.

The obstacle sensing unit 100 includes a first pattern irradiation unit 120, a second irradiation unit 130, and an image acquiring unit 140.

The sensor unit 150 includes a plurality of sensors to assist detection of obstacles. The sensor unit 150 detects front obstacles, that is, obstacles in a running direction using at least one of laser, ultrasonic wave, or infrared ray. Further, the sensor unit 150 includes at least one tile sensor to detect a tilt of a body 10. When the body 10 tilts in a front, rear, left, or right direction, the tilt sensor calculates a tilted direction and angle. The tilt sensor may use a tilt sensor or an acceleration sensor. A gyro sensor, an inertial sensor, or a silicon semiconductor sensor is applicable as the acceleration sensor.

As described above, the first pattern irradiation unit 120, the second pattern irradiation unit 130, and the image acquiring unit 140 are installed at a front surface of the body 10 so that the obstacle sensing unit 100 irradiates first pattern light P1 and second pattern light P2 in a forward direction of the moving robot and shoots the irradiated pattern lights to acquire an image.

Each of the first and second pattern irradiation units 120 and 130 of the obstacle sensing unit 100 may include a light source and an optical pattern projection element (OPPE) configured to create a predetermined pattern by transmitting light irradiated from the light source. The light source may include a laser diode (LD) or a light emitting diode (LED). Since laser light is more excellent than other light sources in monochromaticity, straightness, and a connection characteristic, precise measurement of a distance is possible. In particular, since infrared ray or visible light causes a great deviation in precision of distance measurement according to factors such as colors and materials of a target, it is preferred that the light source is the laser diode. The OPPE may include a lens and a diffractive optical element (DOE). Light of various patterns may be irradiated according to the OPPE included in each of the first and second irradiation units 120 and 130.

The first pattern irradiation unit 120 may light of a first pattern P1 (hereinafter referred to as 'first pattern light') toward a lower side of a forward direction of the body 10. Accordingly, the first pattern light P1 may be incident to a bottom of a cleaning area.

The first pattern light P1 may be configured in the form of a horizontal line. Further, the first pattern light P1 may be configured in the form of a cross-shaped pattern which a horizontal line crosses a vertical line.

The first pattern irradiation unit 120, the second irradiation unit 130, and the image acquiring unit 140 may be vertically arranged in a row. The image acquiring unit 140 is disposed at a lower portion of the first pattern irradiation unit 120 and a lower portion of the second pattern irradiation unit 130. However, the present invention is not limited thereto. The image acquiring unit 140 is disposed at an upper portion of the first pattern irradiation unit 120 and an upper portion of the second pattern irradiation unit 130.

In an embodiment, the first pattern irradiation unit 120 may be located at a top side and irradiate the first pattern light P1 downward toward a forward direction to detect obstacles located downward of the first pattern irradiation unit 120. The second pattern irradiation unit 130 may be located at a bottom side and irradiate light of a second pattern P2 (referred to as 'second pattern light') upward toward the forward direction. Accordingly, the second pattern light P2 may be incident to obstacles located higher than the second pattern irradiation unit 130 or predetermined parts of the obstacles from a wall or a bottom of the cleaning area.

The second pattern may be configured in a pattern different from that of the first pattern light P1. It is preferred that the second pattern is configured to include a horizontal line. Herein the horizontal line is not always a continuous line segment but may be configured by a dotted line.

Meanwhile, as illustrated in FIG. 2, a displayed irradiation angle θh represents a horizontal irradiation angle of the first pattern light P1 irradiated from the first pattern irradiation unit 120, which represents an angle between both ends of a horizontal line Ph and the first pattern irradiation unit 120. Although it is preferred that the displayed irradiation angle θh is in the range of 130° to 140°, the present invention is not limited thereto. The dotted line illustrated in FIG. 2 directs toward the forward direction of the moving robot 1, and the first pattern light P1 may be symmetrical to a dotted line.

Similar to the first pattern irradiation unit 120, it is preferred that a horizontal irradiation angle of the second pattern irradiation unit 130 may be in the range of 130° to 140°. According to the embodiment, the second pattern irradiation unit 130 may irradiate a second pattern light P2 with the same horizontal irradiation angle as that of the first pattern irradiation unit 120. In this case, the second pattern light P2 may be symmetrical to a dotted line illustrated in FIG. 2.

The image acquiring unit 140 may acquire an image in front of the body 10. In particular, first and second pattern lights P1 and P2 are indicated on an image (hereinafter referred to as 'acquisition image') acquired by the image acquiring unit 140. Hereinafter, an image of the pattern lights P1 and P2 indicated on the acquisition image refers to a light pattern. Since the image of the pattern lights P1 and P2 are an image of the pattern lights P1 and P2 incident to a substantially real space, images corresponding to the first pattern light P1 and the second pattern light P2 refer to the first pattern light P1 and the second pattern light P2 by assigning the same reference numerals of the pattern lights P1 and P2 to the images of the pattern lights P1 and P2.

The image acquiring unit 140 may include a digital camera which converts an image of a subject into an electric signal and converts the electric signal into a digital signal to store the digital signal in a memory device. The digital camera may include an image sensor (not shown) and an image processor (not shown).

The image sensor is a device configured to convert an optical image into an electric signal. The image sensor is configured by integrating a plurality of photo diodes in one chip. For example, the photo diode may include a pixel. Electric charges are stored in respective pixels according to an image formed on a chip due to light passing through a lens, and the electric charges stored in the pixels are converted into an electric signal (for example, a voltage). A charge coupled device (CCD) or a complementary metal oxide semiconductor (CMOS) sensor is well known as the image sensor.

The image processor creates a digital image based on an analog signal output from the image sensor. The image processor may include an AD converter configured to convert an analog signal into a digital signal, a buffer memory configured to temporarily store digital data according to the digital signal output from the AD converter, and a digital signal processor (DSP) configured to process the digital data stored in the buffer memory to configure a digital image.

The control unit 200 determines obstacles through an acquisition image input from the obstacle sensing unit 100 and controls the running driver 250 so that the moving robot runs to pass through or avoid obstacles by changing a moving direction or a running path.

The control unit 200 includes a running controller 230 configured to control the running driver 250. Operations of the left wheel drive motor and the right wheel drive motor are independently controlled by the running controller 230 so that the body 10 goes straight or rotates to run.

The control unit 200 includes an obstacle recognition unit 210 configured to analyze data input from the obstacle sensing unit 100 to detect a pattern and to determine an obstacle from the pattern.

The control unit 200 stores the acquisition image in the data unit 240 and the obstacle recognition unit 210 analyzes the acquisition image to extract a pattern.

The obstacle recognition unit 210 extracts a light pattern indicated when a pattern light irradiated from the first pattern irradiation unit 120 or the second pattern irradiation unit 130 is irradiated on a bottom or an obstacle to determine the obstacle based on the extracted light pattern.

The obstacle recognition unit 210 detects light patterns P1 and P2 from an image acquired from the image acquiring unit 140. The obstacle recognition unit 210 may detect features such as points, lines, and planes with respect to predetermined pixels configuring the acquisition image to detect the light patterns P1 and P2 or points, lines, and planes configuring the light patterns P1 and P2.

The obstacle recognition unit 210 may extract segment lines configured by continuing pixels brighter than a periphery to extract a horizontal line Ph configuring the first light pattern P1 and a horizontal line configuring the second light pattern P2. However, the present invention is not limited thereto. Since various schemes for extracting a desired pattern of a form from a digital image is known, the obstacle recognition unit 210 may extract the first light pattern P1 and the second light pattern P2 using the known technology.

Further, the obstacle recognition unit 210 determines presence of obstacles based on the detected pattern to determine a shape of the obstacles. The obstacle recognition unit 210 may determine the obstacles based on the first light pattern and the second light pattern to calculate a distance to the obstacles. In addition, the obstacle recognition unit 210 may determine a size (height) and a shape of the obstacles forms of the first light pattern and the second light pattern, and change in a light pattern achieved during approaching the obstacles.

The obstacle recognition unit 210 determines the obstacles based on a distance to a reference position with respect to the first light pattern and the second light pattern. When the first light pattern P1 is located at a position lower than the reference position, the obstacle recognition unit 210 may determine that there is a downhill ramp. When the first light pattern P1 disappears, the obstacle recognition unit 210 determines a cliff. Moreover, when the second light pattern appears, the obstacle recognition unit 210 may determine a front obstacle or an upper obstacle.

The obstacle recognition unit 210 determines whether a body tilts based on tilt information input from a tilt sensor of the sensor unit 150. When the body tilts, the obstacle recognition unit 210 compensates for a tilt with respect to a position of a light pattern of an acquisition image.

The running controller 230 controls the running driver 250 so that a moving robot runs and cleans a designated area of the cleaning area, and controls the cleaning unit 260 to perform cleaning by sucking dust during running.

The running controller 230 determines whether running or entering is possible corresponding to an obstacle recognized from the obstacle recognition unit 210, sets a running path so that the moving robot approaches the obstacle to run, passes through the obstacle, or avoids the obstacle to control the running driver 250.

Further, the control unit 200 includes a map creator 220 configured to create a map based on detected information on the obstacle during running.

Upon an initial operation or when a map with respect to a cleaning area is not stored, the map creator 220 creates a map with respect to a cleaning area based on obstacle information while running the cleaning area.

The map creator 220 creates a map with respect to the cleaning area based on the obstacle information determined by the obstacle recognition unit 210.

In addition, the map creator 220 creates a base map based on information acquired through running to create a cleaning map by dividing the base map in areas. In addition, the map creator 220 arranges an area with respect to the cleaning map and sets attributes with respect to the area to create a user map and a guide map.

The base map is a map where a shape of a cleaning area acquired through running is indicated as an outline and the cleaning map is a map where an area is identified on the base map. The base map and the cleaning map include a travelable area and obstacle information of a moving robot. The user map is a map obtained by simplifying an area of the cleaning map, arranging a shape of an outline, and applying a visual effect. The guide map is a map obtained by overlapping the cleaning map with the user map. Since the cleaning map is indicated on the guide map, a cleaning command may be input based on an area which the moving robot may actually run.

The moving robot performs cleaning based on the cleaning map and transmits the user map and the guide map to a terminal. The terminal 300 may store the guide map and the user map to display both or one of the guide map and the user map on a screen according to setup. When the terminal 300 inputs a cleaning command based on the user map or the guide map to the moving robot 1, the moving robot 1 runs based on the cleaning map to clean a designated area.

The map creator 220 divides the cleaning area into a plurality of areas after creating the base map to create a map including a connection path connecting the plurality of area to each other and information on obstacles in each area. The map creator 220 configures a representative area by dividing small areas in order to dividing an area on a map, sets the divided small areas as a separate detail area, and merges separate detail area with the representative area to create a map including divided areas.

The map creator 220 manufactures a shape of the divided areas. The map creator 220 sets attributes with respect to the divided areas to manufacture a shape of an area according to attribute by area.

The map creator 220 firstly determines a main area based on the number of contact points with other area in each divided area. The main area is basically a living room. However, in some cases, the main area may be changed to one of a plurality of rooms. The map creator 220 sets attributes with respect to remaining areas based on the main area. For example, the map creator 220 may set an area larger than a predetermined size disposed based on a living room being a main area and may set remaining areas as other areas.

The map creator 220 manufactures each area to have a specific form according to reference attributes of an area. For example, the map creator 220 manufactures a form of a room at general home, for example, a form of an area based on a square. Further, the map creator 220 extends a form of an area based on the outermost cell of the base map, and manufactures a form of the area by removing or reducing an area which the moving robot cannot approach due to obstacles.

In addition, the map creator 220 displays obstacles larger than a predetermined size on a map and does not display obstacles smaller than the predetermined size by removing a corresponding cell according to a size of the obstacles from the base map. For example, the map creator 220 displays furniture such as chairs or sofas larger than a predetermined size on the map but removes temporarily appeared obstacles smaller than the predetermined size, for example, small toys on the map. The map creator 220 stores a position of a charging frame together with a map upon creating the map.

After the map is created, the map creator 220 may add detected obstacles on the map based on obstacle information input from the obstacle recognition unit 21. When a specific obstacle is repeatedly detected at a fixed position, the map creator 220 adds the detected obstacle on the map. When the obstacle is temporarily detected, the map creator 220 ignores the obstacle.

The map creator 220 creates and transmits a user map being a manufactured map and a guide map displayed by overlapping the user map with the cleaning map to the terminal 300.

The control unit 200 may recognize a current position of the body 10 based on a stored map (cleaning map, guide map, or user map). If a cleaning command is input, the control unit 200 determines whether a position on the map corresponds to a current position of the moving robot. When the current position does not correspond to a positon on the map, or the current position cannot be confirmed, the control unit 200 recognizes the current position to recover a current positon of the moving robot 1 and controls a running unit so that the moving robot moves to a designated area based on the current position. A cleaning command may be input from a remote controller (not shown), an operation unit 160, or a terminal 300.

When the current position does not correspond to a positon on the map, or the current position cannot be confirmed, the control unit 200 may analyze an acquisition image input from the image acquiring unit 140 to estimate a current position based on a map.

When the map is updated by the map creator 220 during running, the control unit 200 transmits the updated information to the terminal 300 through a communication unit so that a map stored in the terminal 300 is the same as a map stored in the moving robot 1. Accordingly, as the map stored in the terminal 300 is the same as the map stored in the moving robot 1, the moving robot 1 may clean a designated area. Further, the terminal 300 may display a current position of the moving robot 1 on a map.

When the cleaning command is input, the running controller 230 controls a running unit so that the moving robot 1 moves to a designated area of a cleaning area, and operates a cleaning unit so that cleaning is performed together with running.

When a cleaning command with respect to a plurality of areas is input, the running controller 230 moves to an area according to whether to set a priority area or a designated order so that cleaning is performed. When a separate order is not designated, the moving robot moves to a close area or an adjacent area according to a distance based on a current position to perform cleaning.

Moreover, if a cleaning command with respect to an optional area is input regardless of division of an area, the running controller 230 moves to an area included in the optional area to perform cleaning.

If cleaning with a preset designated area finishes, the controller 200 stores a cleaning record in a data unit 240.

In addition, the control unit 200 transmits an operation state or a cleaning state of the moving robot 1 to the terminal 300 at a predetermined time period through a communication unit 190.

The terminal 300 displays a positon of the moving robot 1 on a map of an executed application together with a map based on data received from the moving robot 1, and outputs information on the cleaning state.

The terminal 300 displays one of the user map or the guide map according to setup and may change and display the map according to setup.

The terminal 300 displays a received map, may separate or merge an area through key input or touch input, and may change or add attributes of the area. Further, the terminal may designate a positon of a specific obstacle on a map and transmits information on a designated obstacle to the moving robot to be added to a stored map.

The terminal 300 may designate a cleaning area corresponding to key input or touch input with respect to a displayed map, may set a cleaning order, and transmits the cleaning command to the moving robot 1.

Further, the terminal 300 displays a cleaning state on a displayed map (the user map and the guide map) based on data received from the moving robot 1. When information on the obstacle is added, the terminal updates and display the map based on the received data.

Further, if a charging frame is detected through a return signal of the charging frame, the control unit 200 recognizes a current position of the moving robot and calculates and stores a position of the charging frame based on the current position of the moving robot 1. The control unit 200 may set so that a position of the charging frame is displayed on the map.

Figure 6:
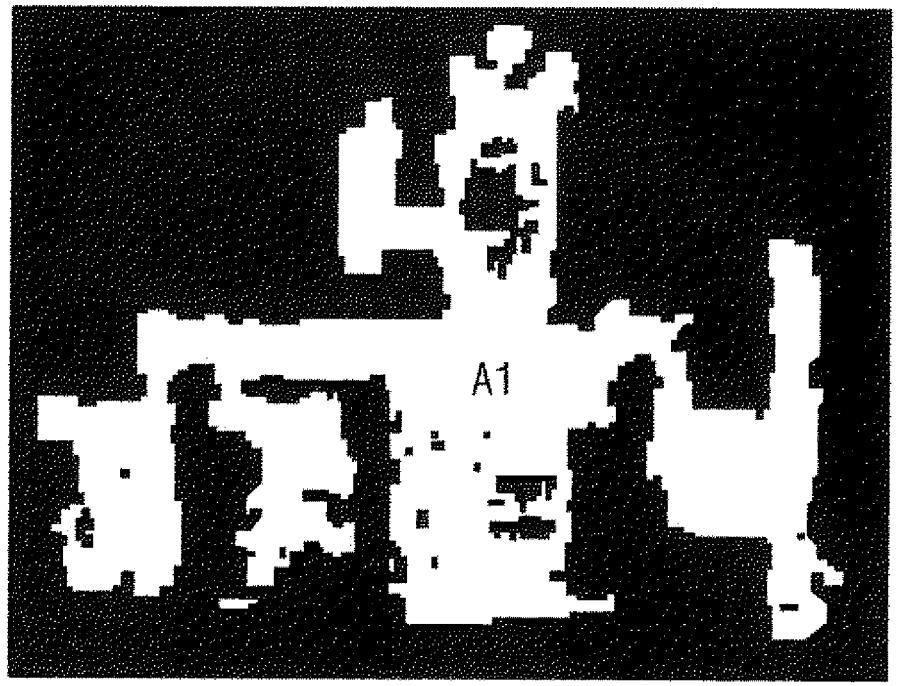
FIG. 6 and FIG. 7 are reference diagrams illustrating a map creating method in a moving robot according to an embodiment of the present invention.
Figure 6:
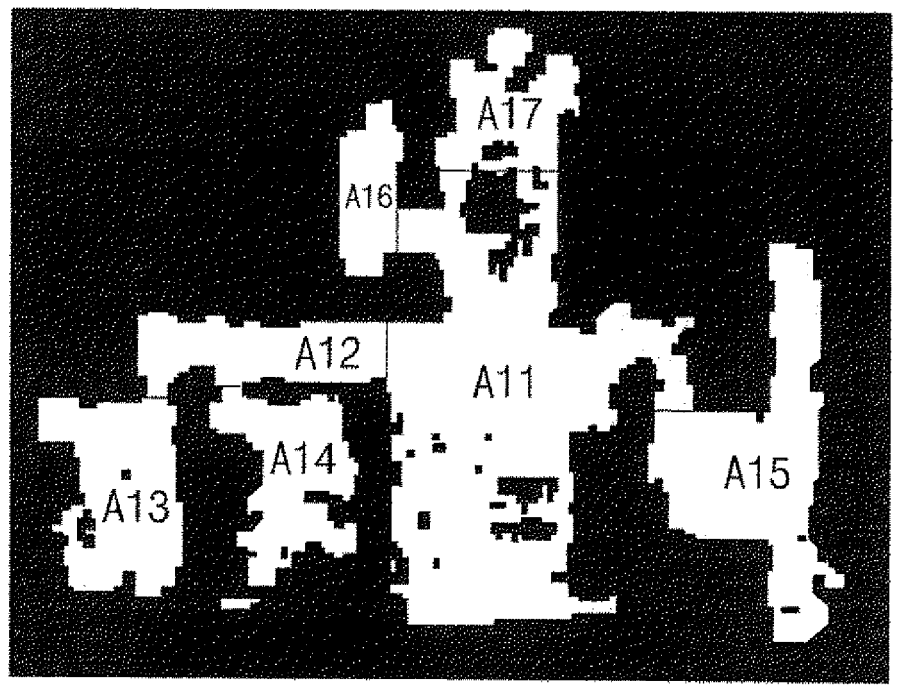
Figure 7:
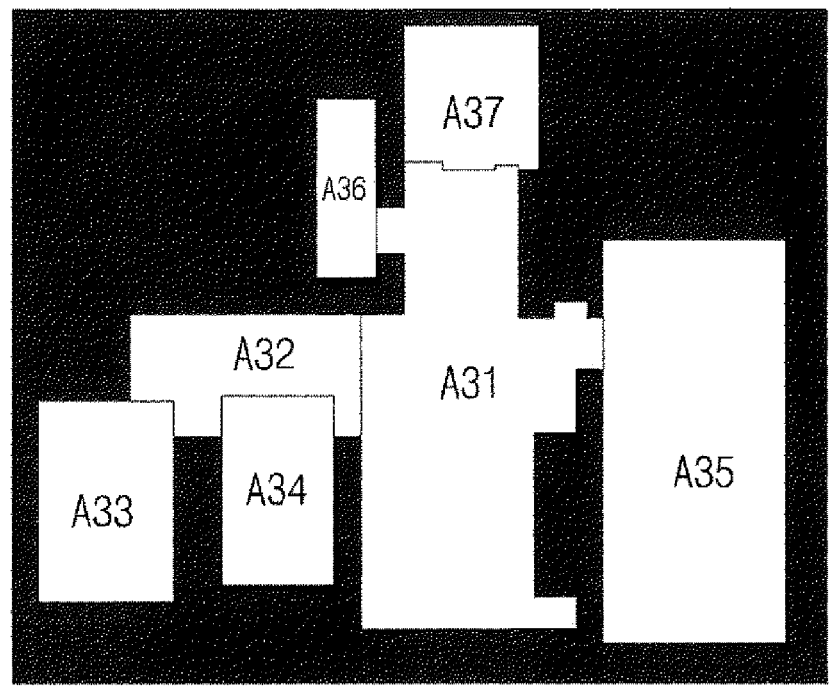
Figure 7:
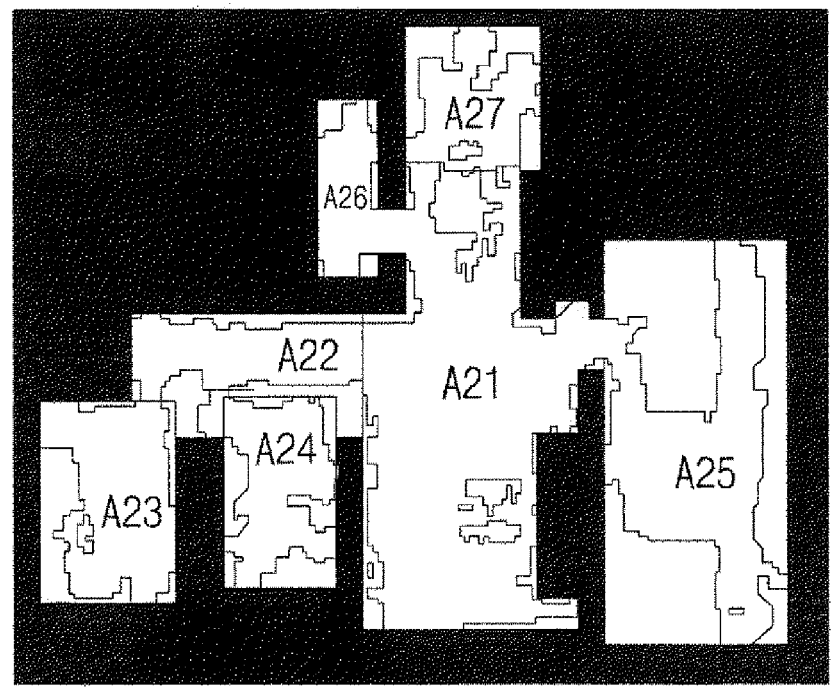

FIG. 6 and FIG. 7 are reference diagrams illustrating a map creating method in a moving robot according to an embodiment of the present invention.

As shown in FIG. 6, when the map is not stored or upon an initial operation, the moving robot 1 may run a cleaning area through wall track (wall following) to create a map. Furthermore, the moving robot 1 may clean a cleaning area in a state having no map to create a map through acquired obstacle information.

As shown in FIG. 6(*a*), the map creator 220 creates a map based on data input from the obstacle sensing unit 100 and the sensor unit 150 and obstacle information from the obstacle recognition unit 210 during running.

The map creator 220 creates a base map A1 configured by an outline with respect to a cleaning area through the wall track (wall following). Since the base map is a form of an output with respect to the whole area, the area is not identified.

As shown in FIG. 6(*b*), the map creator 220 divides the base map A1 into a plurality of areas A11 to A17 to create a map having divided areas and a cleaning map.

The map creator 220 divides small areas smaller than a predetermined size and sets a representative area larger than the predetermined size. The map creator 220 may erode and dilate a base map through morphology calculation to divide the small areas so that a representative area may be set. The map creator 220 configures a constituent element of a predetermined form in an image to be processor, that is, a base map, and performs an erosion calculation by completely adding the constituent element to an area of the image. Moreover, the map creator 220 may perform a dilation calculation so that a part of the constituent element is included in the area of the image. Forms of erosion and dilation may be changed in the image area according to setup of the constituent element.

The map creator 220 sets a detail area with respect to remaining small areas except for a representative area. Since the detail area is an area to connect the representative area or an area attached to the representative area, the map creator 220 merges each detail area with one representative area to reset the area. The map creator 220 merges each detail area with one representative area based on presence of connection of each representative area, and correlation such as the number and a distance of connection points. Further, when the detail area B is larger than a predetermined size, the map creator 220 may set a corresponding detail area as a separate area.

Accordingly, the map creator 220 creates a cleaning map having divided areas by merging the detail area with the representative area.

The map creator 220 divides a plurality of areas by merging the detail area with the representative area and then sets a main area, a room, and other areas corresponding to the number of contact points of each representative area making contact with other area and a size of an area. The main area is set as a living room as an example.

In addition, the map creator 220 sets attributes with respect to a plurality of areas based on a main area. The map creator 220 sets remaining areas except for the main area as a room or other areas according to a size and a form thereof.

As shown in FIG. 7(*a*), the map creator 220 creates the cleaning map and manufactures a form of an area that allows a user to easily recognize each area.

The map creator 220 arranges a small area or an obstacle by simplifying a form of the area and enlarges or removes the area. The map creator 220 manufactures an area in a predetermined form according to attributes of the area. For example, the map creator 220 may manufacture a room in a square shape.

The map creator 220 manufactures a form of an area and applies a visual effect thereto to create a user map configured by a plurality of areas A31 to A37.

A plurality of areas may be displayed with different colors and a name with respect to each area may be displayed on the user map. Further, an area of the same attribute is displayed with the same color on the user map according to attributes of the area. In addition, information on a specific obstacle is displayed in the form of images, emoticons, or special characters on the user map.

Furthermore, the map creator 220 allows a plurality of areas A31 to A37 of the user map to have a specific form according to attributes of the area. The map creator 220 may subdivide one area to set other areas as shown in FIG. 8.

As shown in FIG. 7(*b*), the map creator 220 creates a guide map including a plurality of areas displayed by overlapping the clean map with the user map. The guide map displays a state that small obstacles of the cleaning map are removed.

The moving robot 1 stores created maps, that is, the cleaning map, the guide map, and the user map in the data unit 240, and transmits the user map and the guide map to external devices such as a remote controller, the terminal 300, and a controller.

Figure 8:
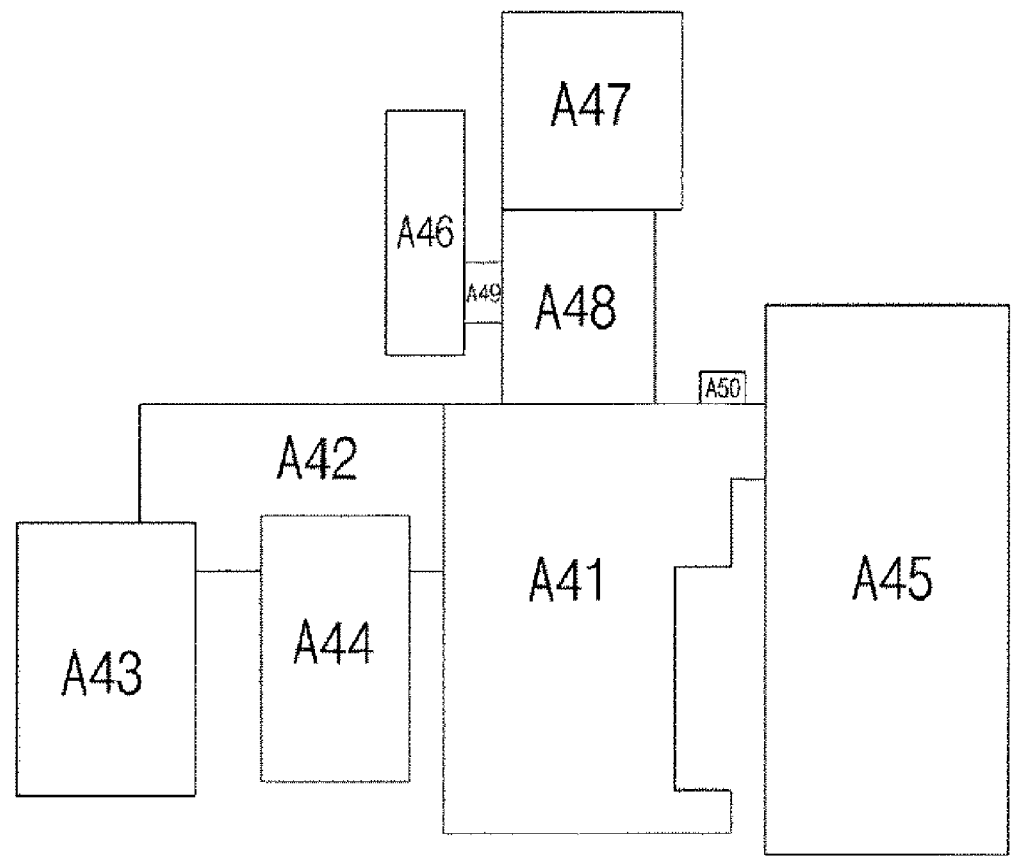
FIG. 8 is a diagram illustrating an example of a created map in a moving robot according to an embodiment of the present invention.

FIG. 8 is a diagram illustrating an example of a created map in a moving robot according to an embodiment of the present invention.

As shown in FIG. 8, the terminal 300 executes a program or an application for controlling the moving robot and displays received and stored maps, that is, the user map or the guide map on a screen.

A plurality of areas A41 to A50 divided may be differently displayed and a color may be displayed or a name of the area according to attributes of the area on the user map or the guide map. Further, the attributes of the areas may be displayed and areas of the same attributes may be displayed with the same color.

The terminal 300 displays a position of the obstacle on the user map or the guide map, and displays images, icons, and emoticons with respect to the obstacle according to a type of the obstacle.

If a cleaning command is input with respect to the user map or the guide map, the terminal 300 transmits the input cleaning command to the moving robot 1, and the moving robot 1 moves a designated area according to the received cleaning command to clean based on the cleaning map. The moving robot 1 matches the input cleaning command with the cleaning map based on the user map or the guide map to determine a designated area.

The moving robot 1 and the terminal 300 store the same map. When one of the maps of the moving robot 1 and the terminal 300 is changed, changed data are transmitted to another side so that the map is updated.

Figure 9:
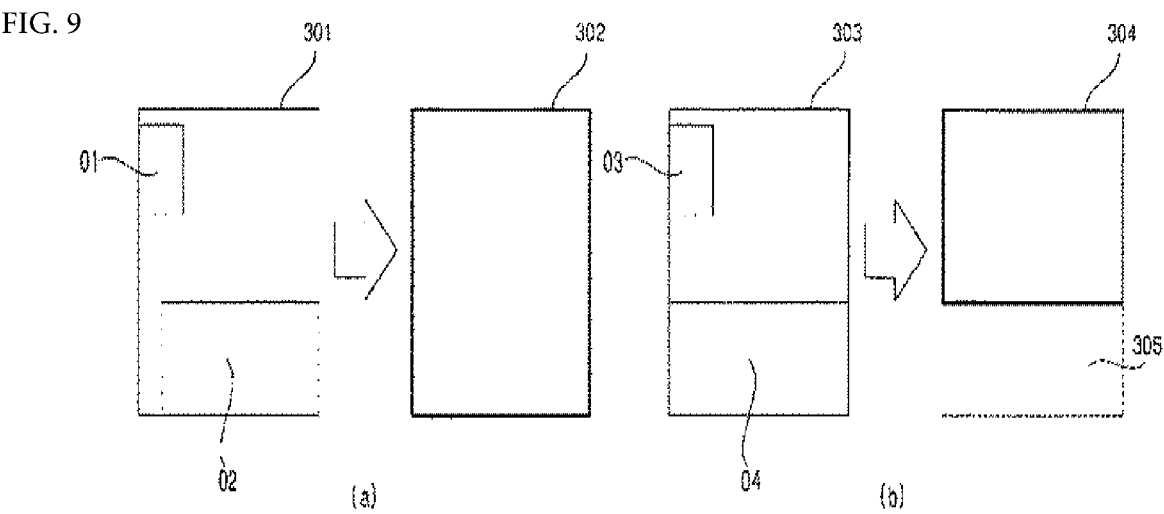
FIG. 9 and FIG. 10 are reference diagrams illustrating a map correcting method in a moving robot according to an embodiment of the present invention.
Figure 10:
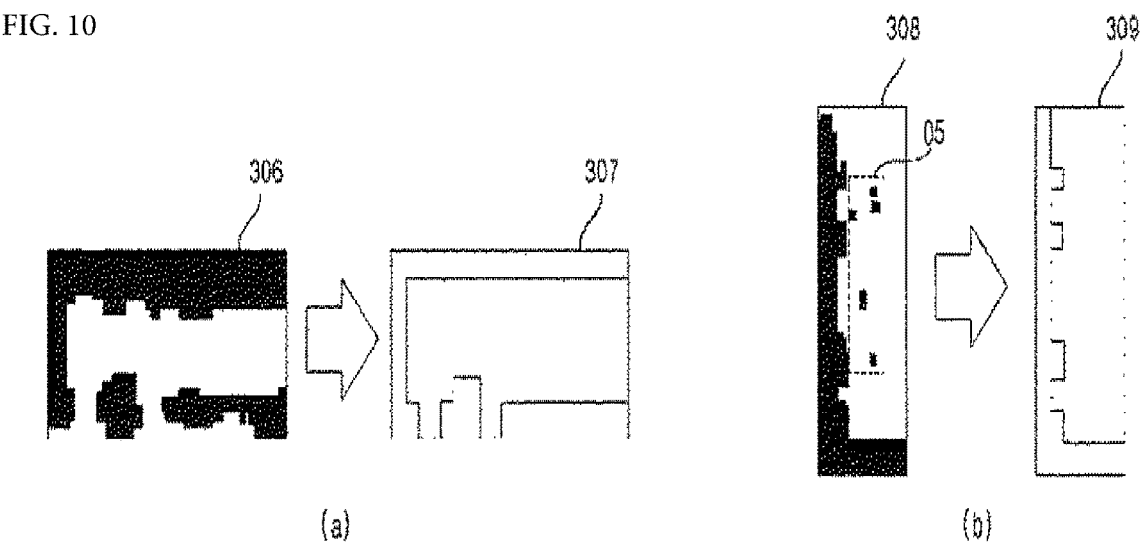

FIG. 9 and FIG. 10 are reference diagrams illustrating a map correcting method in a moving robot according to an embodiment of the present invention.

The map creator 220 manufactures a form of an area from the cleaning map to create the user map. The map creator 220 manufactures a map in a specific form according to attributes of the area and corrects the shape of the area according to the size of the obstacle.

As shown in FIG. 9(*a*), when the first obstacle 01 and the second obstacle 02 are located within the first area 301, the map creator 220 may manufacture a form of the first area 301 so that the obstacle is included in the area to change the area of the map to a form of the second area 302.

The map creator 220 manufactures a form of an area based on a different reference according to attributes of the area. When the first area 301 is a room, the map creator 220 manufactures a form of an area to have a square shape. Meanwhile, since a living room being a main area includes a plurality of obstacles, the map creator 220 manufactures a form of an area corresponding to an outline and a small obstacle as a polygonal shape.

As shown in FIG. 9(*b*), since a travelable area is reduced and become an area which cannot approach due to the fourth obstacle with respect to the third obstacle 03 and the fourth obstacle 04 included in the third area, the map creator 220 may manufacture an area of a map with respect to the second area in a form of the fourth area 304 except for an area 305 in which the fourth obstacle is located.

The map creator 220 manufactures a form of an area displayed on a map corresponding to attributes of an area and the size of an obstacle included in the area.

As shown in FIG. 10(*a*), the map creator 220 changes an area of a map in a form of a seventh area 307 so that an outline of an area becomes a straight form by simplifying a form of the sixth area 306. The map creator 220 sets an area based on an outermost line to manufacture a shape of a map while ignoring obstacles smaller than a predetermined size.

In addition, as shown in FIG. 10(*b*), the map creator 220 removes obstacles smaller than a predetermined size and displays obstacles larger than the predetermined size according to a size with respect to obstacles 05 located inside the eighth area 308.

Figure 11:
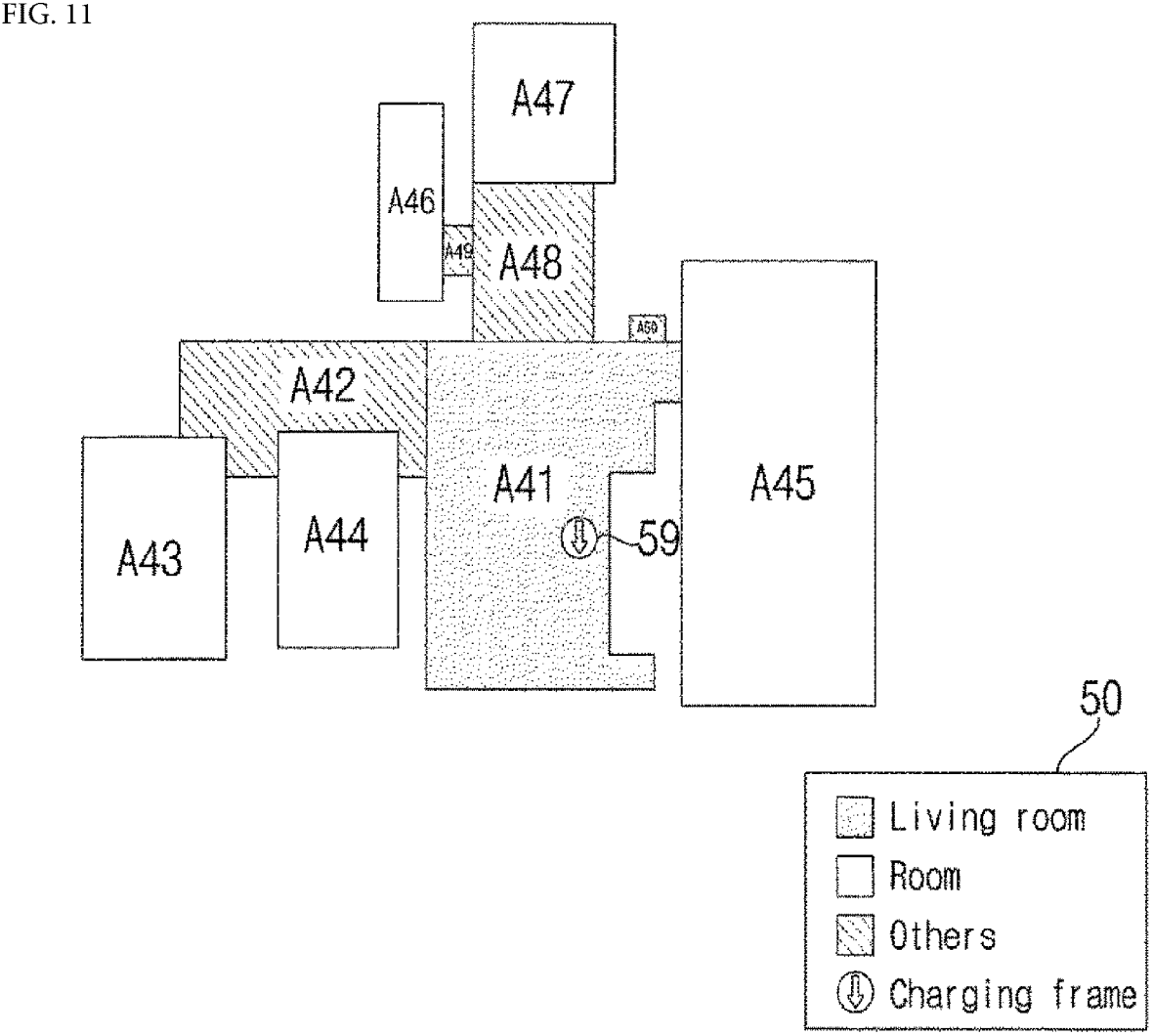
FIG. 11 is an exemplary diagram illustrating a map displaying attributes by area shown in FIG. 8.

FIG. 11 is an exemplary diagram illustrating a map displaying attributes by region shown in FIG. 8.

As shown in FIG. 11, the moving robot 1 manufactures a form of an area from the cleaning map to create a user map having attributes of an area.

The map creator 220 sets a main area, a room, and other areas as attributes with respect to a plurality of areas included in the user map.

As described above, the map creator 220 sets a main area according to a size of an area and the number of contact points with other area. For example, a living room may be set as a main area.

Further, the map creator 220 sets a room and other areas as attributes of an area according to a size and a form of the area.

The terminal 300 receives and displays the user map and the guide map on a screen.

The terminal 300 differently displays each area according to attributes of an area set in a plurality of areas. For example, the terminal may display a plurality of areas with different colors or patterns according to attributes. The terminal 300 separately displays a main area A41, a plurality of rooms A43, A44, A45, A47, and A46, and other areas A48, A49, and A50.

The terminal 300 displays a position of a charging frame on the user map and displays a docking direction as an arrow.

Further, the terminal 300 may output a guide map overlapping with a cleaning map with respect to a really travelable area on a screen. When a guide map is displayed on a screen, the terminal 300 may differently display each area according to attributes of an area as in the user map.

Figure 12:
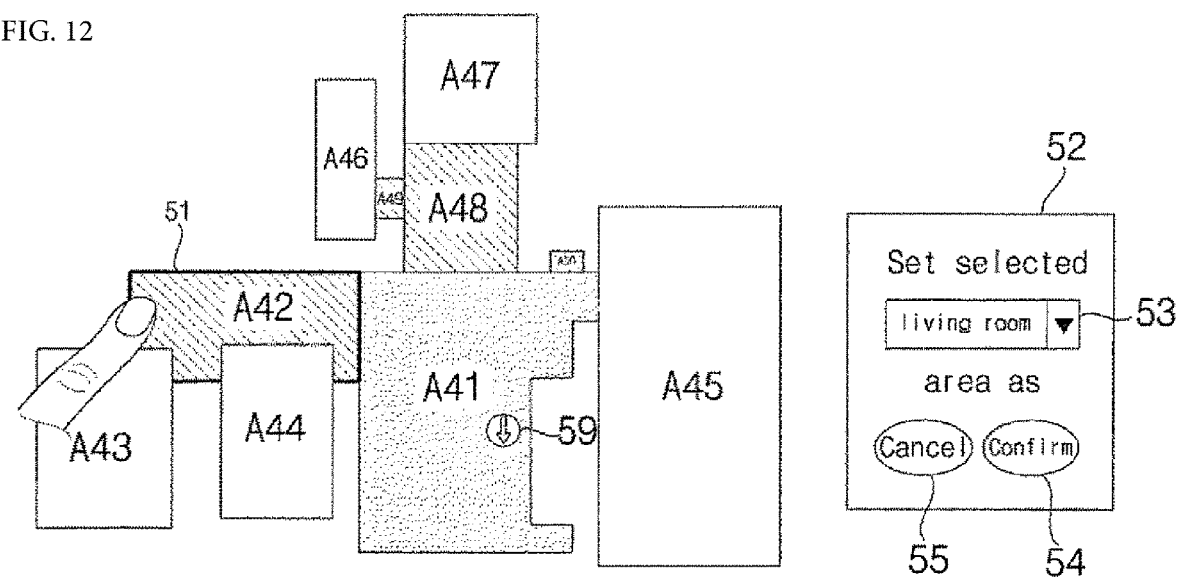
FIG. 12 is a diagram illustrating an example of modifying attributes by area in a map shown in FIG. 11.
Figure 12:
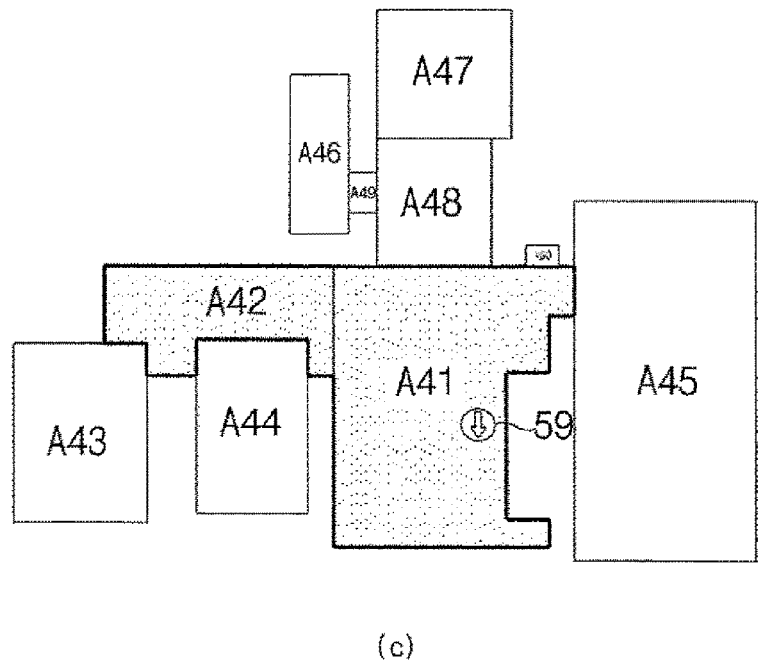

FIG. 12 is a diagram illustrating an example of modifying attributes by region in a map shown in FIG. 11.

As shown in FIG. 12(*a*), if one area 51 is selected by key input or touch input in a state that the user map is displayed on the screen, the terminal 300 outputs an attribute change menu 52 as shown in FIG. 12(*b*).

The terminal 300 may change attributes with respect to an area 51 selected through the attribute change menu 52. If one attribute is selected from attribute items 53 and a confirmation key 54 is selected, the terminal 300 changes attributes of the selected area 51. When a cancel key is selected, the screen returns to the user map from the attribute change menu 52.

For example, when attributes of forty second area A42 (51) is changed to a living room from other area, as shown in FIG. 12(c), the attributes of the forty second area A42 is changed to a living room being a main area. The terminal 300 changes and displays the forty second area A42 according to the attributes of a living room.

Figure 13:
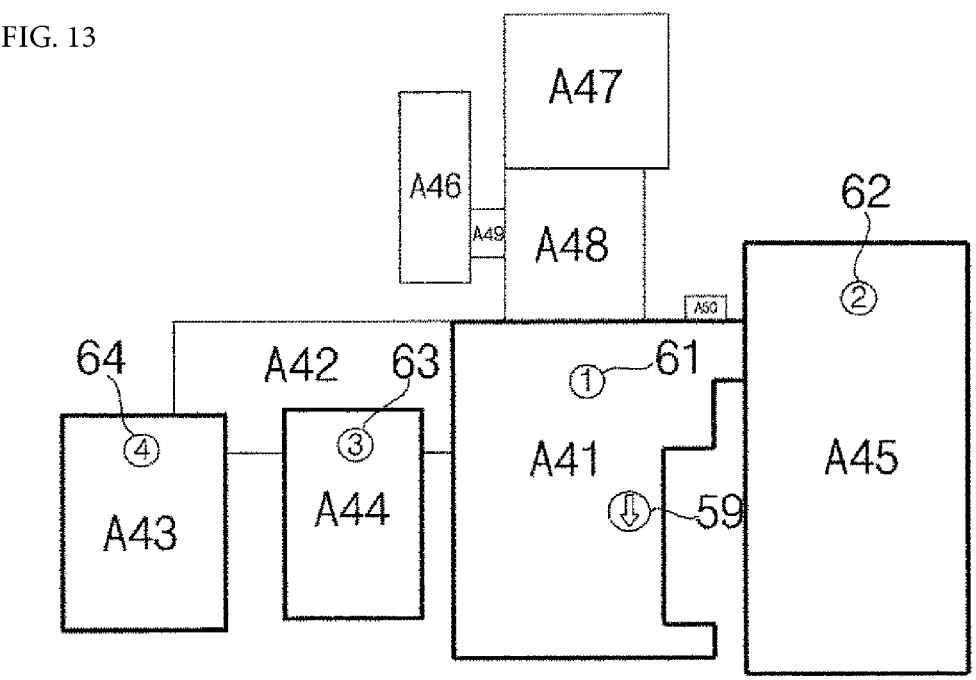
FIG. 13 is a reference diagram illustrating a cleaning setting method using a map in a moving robot according to an embodiment of the present invention.
Figure 13:
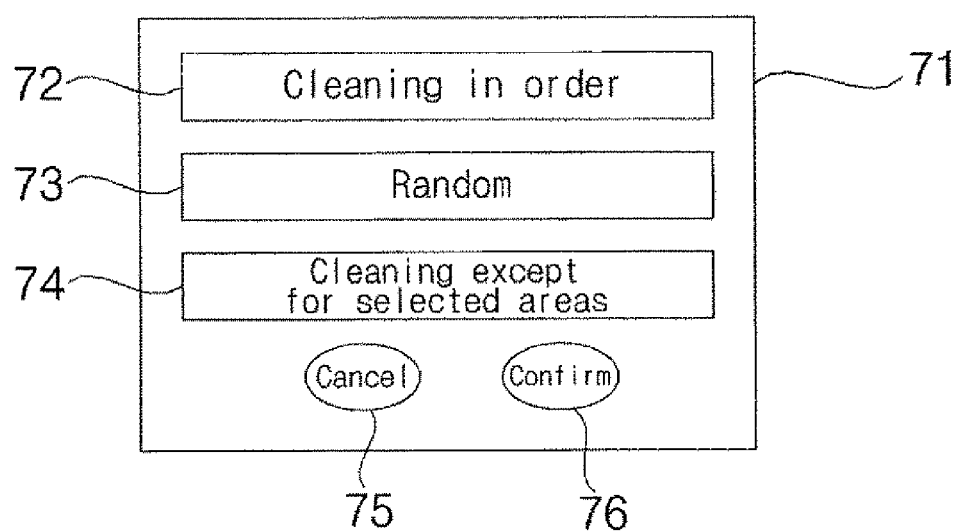

FIG. 13 is a reference diagram illustrating a cleaning setting method using a map in a moving robot according to an embodiment of the present invention.

As shown in FIG. 13(a), the terminal 300 selects at least one area and sets cleaning to transmit a cleaning command to the moving robot 1 while displaying a user map or a guide map is displayed.

In a state that the user map is displayed, when a plurality of areas A41, A42, A43, and A45 are selected in a predetermined order, the terminal 300 sets a cleaning order in selected orders 61 to 64.

As shown in FIG. 13(b), if a plurality of areas is selected, the terminal 300 displays a cleaning menu 71 on a screen.

The terminal 300 may set one of cleaning 72 in order, random 73, and cleaning 74 except for selected areas with respect to a plurality of areas selected through a cleaning menu 71 as cleaning.

If the cleaning 72 in order is selected from the cleaning menu 71 or a confirmation key 76 is input, the terminal 300 transmits a cleaning command to the moving robot 1 so that each area is cleaned in an order of selected areas 61 to 64. Accordingly, the moving robot 1 runs an area in a designated order to performing cleaning.

When the random 73 is selected, the terminal 300 transmits a cleaning command to the moving robot 1 so that the moving robot 1 cleans a plurality of areas selected regardless of an order. Accordingly, the moving robot 1 moves to an area close to a current position to perform cleaning.

When cleaning 74 except for a selected area is set, the terminal 300 transmits a cleaning command with respect to areas except for selected areas to the moving robot 1. The moving robot 1 receives information on remaining areas except for the selected areas to perform cleaning.

When a cancel key 75 is input, the terminal 300 returns the screen to the user map.

Figure 14:
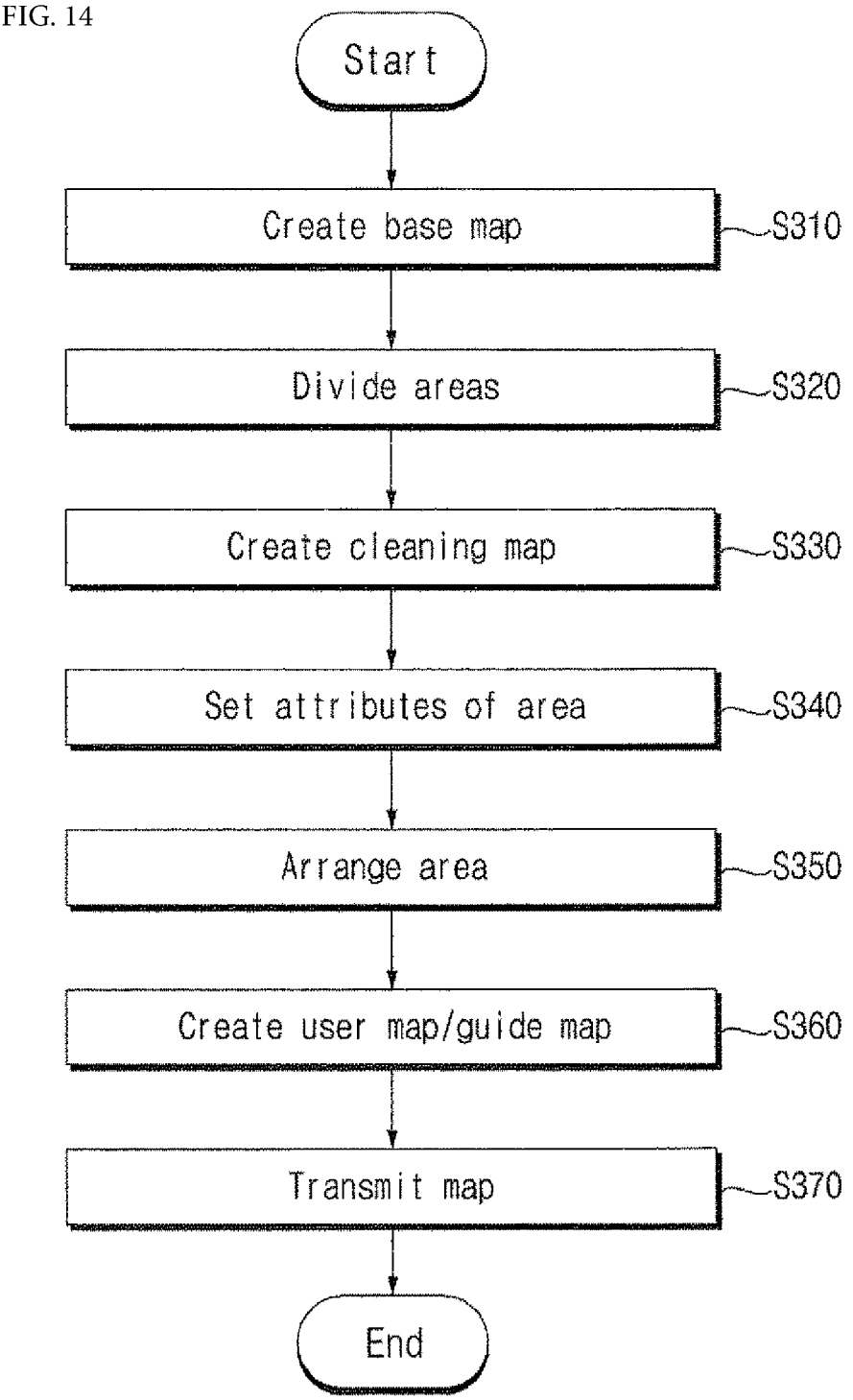
FIG. 14 is a flowchart illustrating a control method of a moving robot according to an embodiment of the present invention.

FIG. 14 is a flowchart illustrating a control method of a moving robot according to an embodiment of the present invention.

As shown in FIG. 14, when the map is not stored, the moving robot 1 runs a cleaning area to acquire obstacle information and to acquire an outline with respect to a cleaning area.

The running controller 230 controls a running driver so that the body 10 moves along a wall of a cleaning area. The obstacle sensing unit 100 inputs an acquisition image with respect to a light pattern during running to the control unit 200. Further, the sensor unit 150 detects an obstacle located in a running direction to input a detection result to the control unit. The obstacle recognition unit 210 analyzes data of a sensor and an input acquisition image to determine a position, a shape, and a size of the obstacle. The map creator 220 creates a map based on obstacle information.

After the moving robot 1 finishes running with respect to a cleaning area, the map creator 220 creates a base map with respect to a cleaning area based on acquired information (S310).

The map creator 220 divides a base map connected without division of areas according to a size of the areas into a representative area and a small area and divides the small area to merge the divided small area with the representative area, which leads to division of the areas on a map (S320).

The map creator 220 creates a cleaning map having a plurality of area divided (S330).

The map creator 220 sets attributes of an area based on a size of each area and the number of contact points between areas (S340).

For example, the map creator 220 sets the widest area or an area having the most contact points with other area as a main area (living room), sets an area larger than a predetermined size based on the main area as a room, and sets remaining areas as other areas.

The map creator 220 arranges a complicated outline of the cleaning map and changes a form of areas with respect to a plurality of areas to manufacture a form of an area displayed on a map (S350).

The map creator 220 changes the form of the area based on different references according to the attributes of the area. Further, the map creator 220 changes the form of the area according to the size of an included obstacle based on the outermost line.

For example, the map creator 220 manufactures a form of an area being a room based on a square. When the main area is a living room, the map creator 220 manufactures the form of the area to have a polygon shape based on a shape of an outline. The map creator 220 sets an area of a map except for an area which cannot approach due to obstacles, and manufactures a form of an area except for obstacles smaller than a predetermined size.

Accordingly, the map creator 220 creates a user map having a manufactured form of an area, and combines the user map with the cleaning map to create a guide map displayed by overlapping the user map with the cleaning map (S360).

The control unit 200 transmits the created user map and guide map to a terminal 300 (S370).

When a new obstacle is detected during running, the moving robot 1 displays and updates a position and a type of an obstacle on a stored map (cleaning map, user map, and guide map) and transmits changed data to the terminal 300.

The terminal receives and stores the user map and the guide map and display one map on a screen according to setup. The terminal 300 differently displays each area according to attributes of an area with respect to the user map or the guide map, displays a position of an obstacle on a map, and changes setup of a map through key input or touch input. When setup of the map is changed, the terminal 300 transmit changed data to the moving robot 1.

Further, if cleaning setup is input through the user map and the guide map, the terminal 300 transmits a cleaning command to the moving robot and displays a position of the moving robot and information on a cleaning state based on data received from the moving robot at a predetermined time interval.

INDUSTRIAL APPLICABILITY

Accordingly, the moving robot 1 according to the present invention creates a map based on detected obstacle information and performs cleaning based on the created map. The moving robot divides an area with respect to a crated map to set attributes of the divided areas, and changes a form of the area to manufacture the area in a form which the user easily recognize. Accordingly, the user may easily recognize a cleaning area through a map displayed on a map to input a cleaning command.

Although embodiments have been described with reference to a number of illustrative embodiments thereof, it should be understood that numerous other modifications and embodiments can be devised by those skilled in the art that will fall within the spirit and scope of the principles of this disclosure.

The invention claimed is:

1. A moving robot comprising:
   a body running a cleaning area to suck foreign matters;
   an obstacle sensing unit configured to detect obstacles by acquiring a front image of the body;
   a data unit configured to store a map with respect to the cleaning area; and
   a control unit configured to determine the obstacles from the acquired image from the obstacle sensing unit, to create a cleaning map including information on a travelable area of the cleaning area based on information on the obstacles, and to control the body to run the cleaning area based on the cleaning map to pass through or avoid the obstacles,
   wherein the control unit changes forms and outlines by area to create a manufactured user map corresponding to a form of the cleaning area, and
   wherein the control unit changes the form and the outline of the area by removing obstacles smaller than a predetermined size and including obstacles larger than the predetermined size corresponding to obstacles located in the area.

2. The moving robot of claim 1, wherein the control unit changes the form of the area and simplifies the outline to create the user map in a drawing form.

3. The moving robot of claim 1, wherein the control unit changes the form of the area by extending, reducing or removing the area based on an outermost line of the area.

4. The moving robot of claim 1, wherein the control unit changes the form of the area based on a different reference corresponding to attributes of the area.

5. The moving robot of claim 1, wherein the control unit changes the form of the area based on a square.

6. The moving robot of claim 1, wherein the control unit sets attributes of a plurality of areas included in the cleaning map or the user map as one of a main area, a room, or other area.

7. The moving robot of claim 6, wherein the control unit set one of the plurality of areas as the main area according to a size of an area and the number of contact points with other area.

8. The moving robot of claim 7, wherein the control unit sets areas larger than a predetermined size as the room and sets remaining areas as the other area based on the main area.

9. The moving robot of claim 7, wherein the control unit sets areas larger than a predetermined size disposed around the main area as the room and sets remaining areas except for the room as the other area.

10. The moving robot of claim 7, wherein the control unit changes the form of the area having attributes of the room among the plurality of areas based on a square.

11. The moving robot of claim 1, wherein the control unit creates a guide map displayed by overlapping the cleaning map with the user map.

12. The moving robot of claim 11, further comprising a terminal configured to receive and store the user map and the guide map and to transmit a cleaning command to the body,
   wherein the control unit transmits a position and a cleaning state of the body at a predetermined time interval.

13. The moving robot of claim 12, wherein the terminal selectively displays one from the user map or the guide map according to setup.

14. The moving robot of claim 12, wherein the terminal differently displays a plurality of areas corresponding to attributes by area and displays attribute information on the attributes by area.

15. The moving robot of claim 14, wherein the terminal changes the attributes of the area corresponding to key input or touch input with respect to the user map or the guide map displayed on a screen.

16. The moving robot of claim 12, wherein the terminal sets cleaning with respect to a designated area and transmits a cleaning command to the body corresponding to key input or touch input with respect to the user map or the guide map displayed on a screen.

17. A control method of a moving robot, the control method comprising:
   running a cleaning area to acquire obstacle information;
   dividing a travelable area of the cleaning area into a plurality of areas based on the obstacle information to create a cleaning map;
   manufacturing the cleaning map by changing forms or outlines of a plurality of areas included in the cleaning map; and
   creating a manufactured user map corresponding to a form of the cleaning area,
   wherein the method further comprises setting attributes with respect to each area of the cleaning map after creating the cleaning map,
   wherein attributes of a plurality of areas included in the cleaning map or the user map are set as one of a main area, a room, or other area, and
   wherein the manufacturing of the cleaning map includes changing the forms and the outlines of the areas by removing obstacles smaller than a predetermined size and including obstacles larger than the predetermined size corresponding to obstacles located in each of the areas of the cleaning map.

18. The control method of claim 17, wherein the manufacturing of the cleaning map comprises creating the user map to have a form similar to the form of the cleaning area by changing the form of each area of the cleaning map and simplifying the outline of each area.

19. The control method of claim 17, wherein the manufacturing of the cleaning map comprises changing the form of the area by extending, reducing or removing the area based on an outermost line by area of the cleaning map.

20. The control method of claim 17, further comprising:
   setting one of the plurality of areas in the cleaning map as the main area according to a size of an area and the number of contact points with other area;
   setting areas larger than a predetermined size disposed around the main area as the room; and
   setting remaining areas except for the main area and the room as the other area.

21. The control method of claim 17, wherein the manufacturing of the cleaning map comprises changing the form of the area based on a different reference corresponding to the attribute of the area.

22. The control method of claim 17, wherein the manufacturing of the cleaning map comprises changing the form of the area having an attribute of the room among the plurality of areas based on a square.

23. The control method of claim 17, further comprising creating a guide map displayed by overlapping the cleaning map with the user map.

24. The control method of claim 23, further comprising transmitting the user map and the guide map to a terminal.

25. The control method of claim 24, further comprising selectively displaying one from the user map or the guide map by the terminal.

26. The control method of claim 24, further comprising differently displaying a plurality of area displayed on the user map and the guide map according to attributes by area by the terminal.

27. The control method of claim 24, further comprising changing attributes with respect to one region of the user map or the guide map corresponding to key input or touch input applied to the terminal.

28. The control method of claim 24, further comprising:
- inputting cleaning setup through key input or touch input corresponding to the user map or the guide map displayed on the terminal;
- receiving a cleaning command including the cleaning setup from the terminal; and
- matching the user map or the guide map with the cleaning map to move to a designated area according to the cleaning command and to perform cleaning by the moving robot.

* * * * *